(12) United States Patent
Zhang et al.

(10) Patent No.: US 10,775,227 B2
(45) Date of Patent: Sep. 15, 2020

(54) WEIGH MODULE WITH SUPPORTING MEMBER

(71) Applicants: Mettler-Toledo Precision Instrument Company Limited, Changzhou, Jiangsu (CN); Mettler-Toledo Measurement Technology Company Limited, Changzhou, Jiangsu (CN); Mettler-Toledo Weighing Equipment Company Limited, Changzhou, Jiangsu (CN)

(72) Inventors: Ping Zhang, Jiangsu (CN); Haitao Zhang, Jiangsu (CN); Christian Gabis, Columbus, OH (US); Tom Leahy, Tipperary (IE)

(73) Assignees: Mettler-Toledo Precision Instrument Company Limited, Changzhou, Jiangsu (CN); Mettler-Toledo Measurement Technology Company Limited, Changzhou, Jiangsu (CN); Mettler-Toledo Weighing Equipment Company Limited, Changzhou, Jiangsu (CN)

( * ) Notice: Subject to any disclaimer, the term of this patent is extended or adjusted under 35 U.S.C. 154(b) by 154 days.

(21) Appl. No.: 16/075,123

(22) PCT Filed: Jan. 24, 2017

(86) PCT No.: PCT/CN2017/072431
§ 371 (c)(1),
(2) Date: Aug. 2, 2018

(87) PCT Pub. No.: WO2017/133582
PCT Pub. Date: Aug. 10, 2017

(65) Prior Publication Data
US 2019/0041257 A1    Feb. 7, 2019

(30) Foreign Application Priority Data

Feb. 3, 2016  (CN) .......................... 2016 1 0078496
Feb. 3, 2016  (CN) ...................... 2016 2 0112692 U

(51) Int. Cl.
*G01G 21/23*    (2006.01)
*G01G 21/02*    (2006.01)
(Continued)

(52) U.S. Cl.
CPC .......... *G01G 21/242* (2013.01); *G01G 21/02* (2013.01); *G01G 21/184* (2013.01); *G01G 21/23* (2013.01)

(58) Field of Classification Search
CPC ...... G01G 21/02; G01G 21/184; G01G 21/23; G01G 21/242
(Continued)

(56) References Cited

U.S. PATENT DOCUMENTS 3,145,795 A * 8/1964 Tate ...................... G01G 5/003
                                                    177/208
4,219,090 A * 8/1980 Dayton .................... G01G 5/04
                                                    177/208
(Continued)

FOREIGN PATENT DOCUMENTS

CN           2331962 Y      8/1999
CN         101078649    *  11/2007
(Continued)

*Primary Examiner* — Jacques M Saint Surin
(74) *Attorney, Agent, or Firm* — Standley Law Group LLP; Jeffrey S. Standley; Stephen L. Grant

(57) ABSTRACT

A weigh module (100) comprises a load cell (4), a supporting member (1), a connecting member (23) and a sealing member (3). The supporting member (1) comprises a receiving hole (13) extending vertically and thoroughly. The connecting member (23) comprises a fixing end (231) fixed to the load cell (4) and a limiting end (232) extending into (Continued)

the receiving hole (13). The limiting end (232) is configured to prevent the supporting member (1) from getting rid of the connecting member (23). The sealing member (3) comprises a first end (311) fixed to the supporting member (1), a second end (321) fixed to the load cell (4) and a raised portion (323).

10 Claims, 6 Drawing Sheets

(51) Int. Cl.
*G01G 21/18* (2006.01)
*G01G 21/24* (2006.01)

(58) Field of Classification Search
USPC .......................................................... 177/253
See application file for complete search history.

(56) References Cited

U.S. PATENT DOCUMENTS

| | | | |
|---|---|---|---|
| 7,371,978 B2 | 5/2008 | Leahy et al. | |
| 7,475,606 B2* | 1/2009 | Selig | G01G 19/4142 |
| | | | 73/862.626 |
| 2008/0041637 A1* | 2/2008 | Macmichael | G01G 21/30 |
| | | | 177/145 |
| 2013/0228384 A1* | 9/2013 | Nagai | G01G 19/393 |
| | | | 177/25.18 |

FOREIGN PATENT DOCUMENTS

| | | |
|---|---|---|
| CN | 101078649 A | 11/2007 |
| CN | 201047775 Y | 4/2008 |
| CN | 101949730 A | 1/2011 |
| CN | 201772922 U | 3/2011 |
| CN | 201803775 U | 4/2011 |
| CN | 203287086 U | 11/2013 |
| EP | 1785704 A1 | 5/2007 |

\* cited by examiner

WEIGH MODULE WITH SUPPORTING MEMBER

TECHNICAL FIELD

The disclosed invention relates to a weigh module, and especially to a weigh module with a supporting member that can be automatically restored.

BACKGROUND OF THE INVENTION

In cement industry, metallurgy industry, chemical industry, food processing industry, petrochemical industry or other industries, when a weighed object is weighed, multiple weighing modules are installed under the weighed object, and automatically the weight of the weighed object is measured. When a force, such as an extrinsic wind force or an intrinsic force is applied on the weighed object, a horizontal force and a vertical force are transferred to the weighing module. If a structure doesn't have a horizontal protection structure and an anti-overturn structure, the weighed object can be moved in any direction, and the weigh module is easily damaged and the working reliability of the weigh module is lowered.

Therefore, an improved weigh module is needed.

SUMMARY OF THE INVENTION

An object of the present invention is to provide a weigh module with a supporting member that can be automatically restored.

According to one aspect of the present invention, a weigh module comprises a load cell, a supporting member, a connecting member and a sealing member. The supporting member comprises a receiving hole extending vertically and through the supporting member. The connecting member comprises a fixing end fixed to the load cell and a limiting end extending into the receiving hole. The limiting end is configured to prevent the supporting member from getting rid of the connecting member. The sealing member comprises a first end fixed to the supporting member, a second end fixed to the load cell and a raised portion.

Other objects, advantages and novel features of the invention will become more apparent from the following detailed description of a preferred embodiment when taken in conjunction with the accompanying drawings.

BRIEF DESCRIPTION OF THE DRAWINGS

Details of the weigh module according to the invention will be apparent from the description of the embodiments that are illustrated in the drawings, wherein.

DETAILED DESCRIPTION OF THE INVENTIONS

Figure 1:
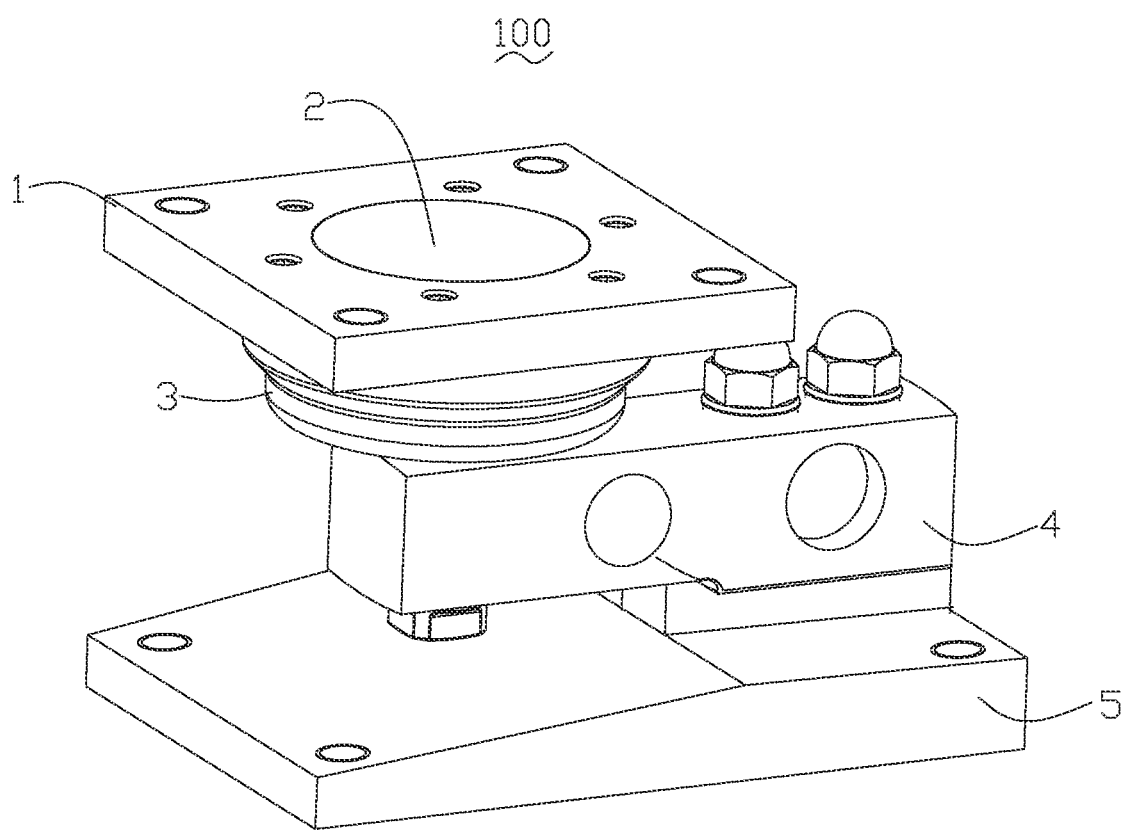
FIG. 1 represents an assembled, perspective view of the weigh module.
Figure 2:
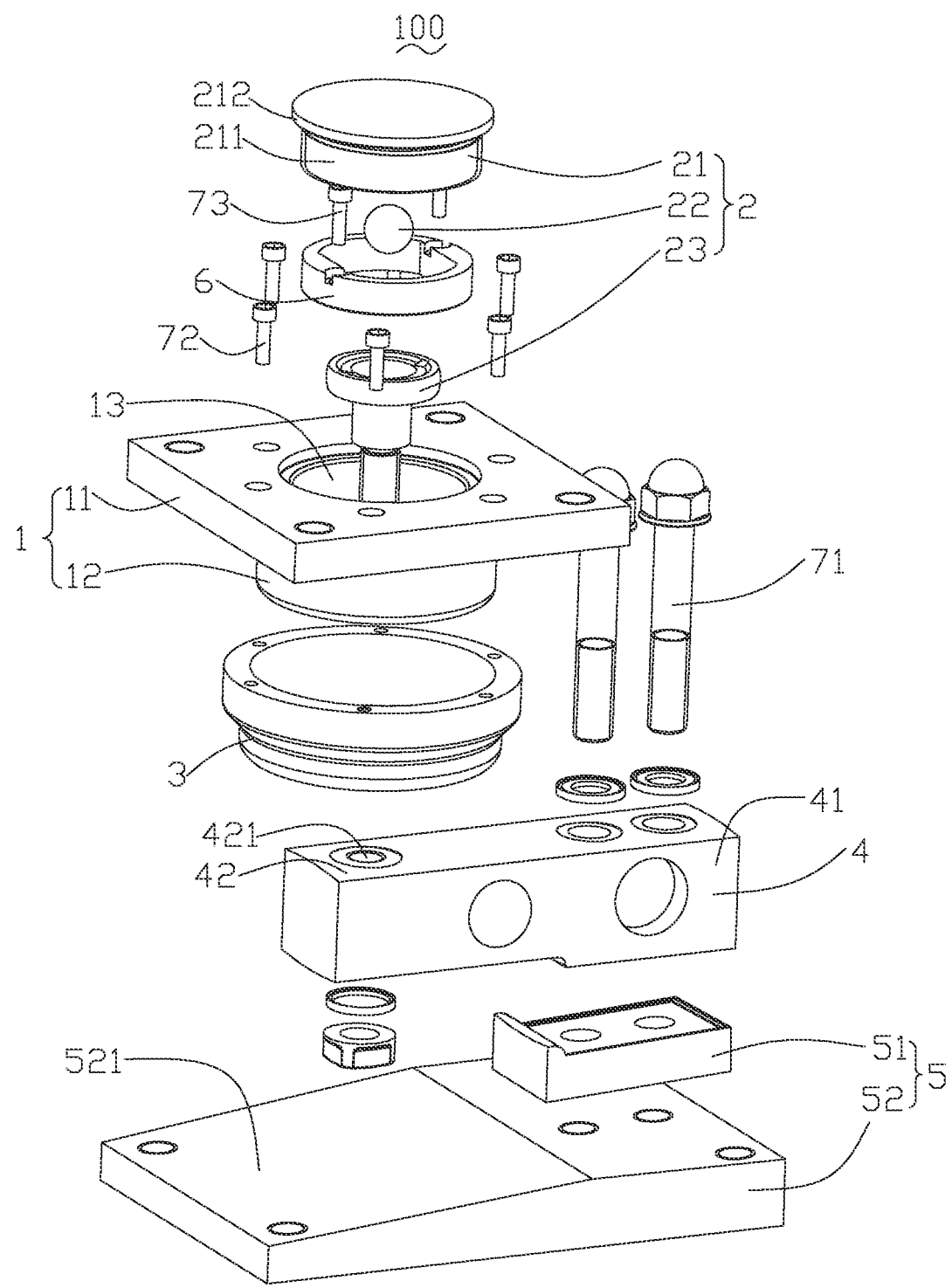
FIG. 2 represents an exploded, perspective view of the weigh module.

FIG. 1 and FIG. 2 illustrates a weigh module 100, which comprises a load cell 4, a supporting member 1 used for installing a weighed object, a load transmitting arrangement 2, a seat plate 5 for mounting the load cell 4, a guiding member 6, a sealing member 3 and a plurality of bolts. FIG. 1 also represents the weigh module in the set-up for use position where the seat plate is at the bottom to contact with the ground and the supporting member on top for installing under the weighed object.

Figure 3:
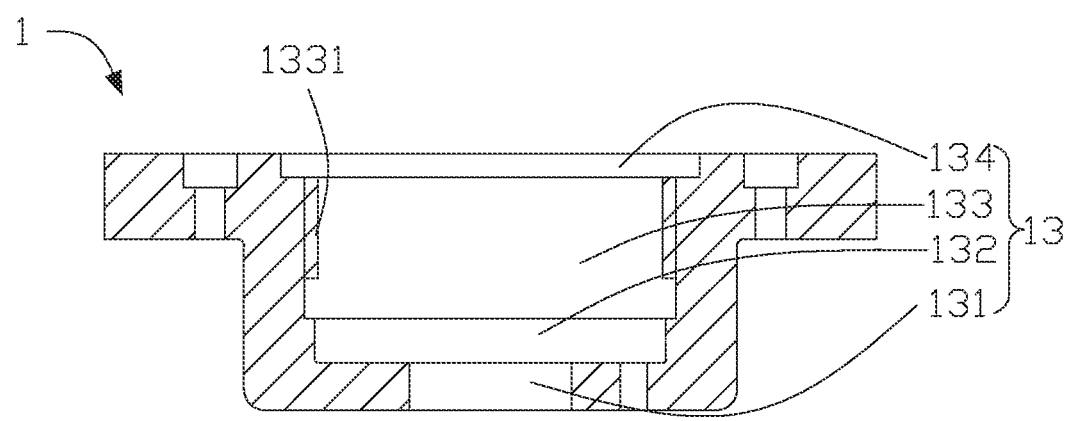
FIG. 3 represents a sectional view of the supporting member.

With reference to FIG. 2 and FIG. 3, the supporting member 1 comprises a cylindrical body portion 12, a rectangle mounting portion 11 connecting with the body portion 12 and a receiving hole 13 extending vertically and through the supporting member 1. The receiving hole 13 comprises a cylindrical first receiving space 131, a cylindrical second receiving space 132 set above the first receiving space 131, a cylindrical third receiving space 133 set above the second receiving space 132 and a cylindrical forth receiving space 134 set above the third receiving space 133. The third receiving space 133 has thread 1331 in it. The first receiving space 131, the second receiving space 132, the third receiving space 133 and the forth receiving space 134 have the same axis, and the diameter of the second receiving space 132 is bigger than that of the first receiving space 131, the diameter of the third receiving space 133 is bigger than that of the second receiving space and the diameter of the fourth receiving space 134 is bigger than that of the third receiving space 133.

The load cell 4 is a beam load cell. The load cell 4 comprises a fixed end 41 fixed to the seat plate 5 and a movable end 42 moving vertically relative to the fixed end 41. The movable end 42 comprises a fixing hole 421 extending vertically and thoroughly and two blind holes 422 set on the upper face of the movable end 42. Two first bolts 71 go through the load cell 4 and fix the load cell 4 to the seat plate 5.

The seat plate 5 comprises a base plate 52 and a connecting plate 51 disposed between the load cell 4 and the base plate 52. The first bolts 71 go through the load cell 4 and the connecting plate 51 and fix the load cell 4 to the base plate 5. The connecting plate 51 comprises a rigid portion 511 and a rubber layer 512 disposed on the surface of the rigid portion 511 so that a metal-to-metal connection is avoided. The height of the rubber layer 512 is about 20% higher than the height of the rigid portion 511 so that a good sealing property is obtained. For obtaining a good washing property, there is a oblique surface 521 in the upper surface of the base plate 51.

Figure 4:
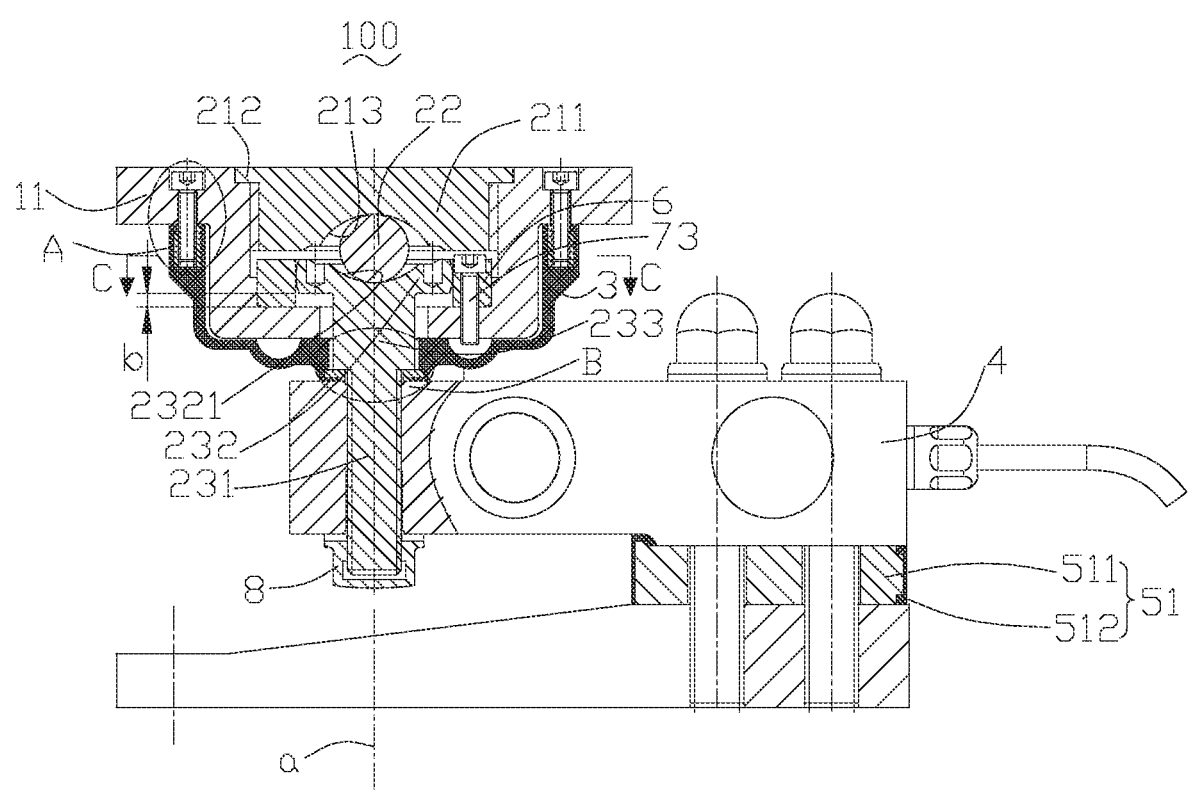
FIG. 4 represents a partial sectional view of the weigh module.

Further with reference to FIG. 4, the load transmitting arrangement 2 comprises a bearing member 21, a connecting member 23 connecting the supporting member 1 to the load cell 4 and a rolling ball 22 disposed between the bearing member 21 and the connecting member 23. In a preferred embodiment, the rolling ball 22 is a steel ball.

The bearing member 21 comprises a cylindrical main body 211 disposed in the third receiving space 133 and a cylindrical end part 212 having the same axis with the main body 211. The diameter of the main body 211 is smaller than that of the end part 212. The main body 211 comprises thread on its surface and the end part 212 is disposed in the fourth receiving space 134. The main body 211 connects with the bearing member 21 by screw joint. When the bearing member 21 is disposed in the receiving hole 13, the bottom face of the end body 212 contacts with the bottom face of the fourth face 134 (the step face between the fourth receiving space 134 and the third receiving space 133) so that a location in the vertical direction is obtained. The bearing member 21 and the supporting member 1 are assembled together by screw joint, the force in the vertical direction applied on the supporting member 1 can be transferred to the bearing member 21 and the water can be prevented from getting into the receiving hole 13 when the weigh module 100 is washed.

The bearing member 21 comprises an arc-shaped lower contact surface 213 connecting with the rolling ball 22. The connecting member 23 comprises an arc-shaped upper contact surface 2321. When a force is applied on the weighed object and the weighed object wobbles, this structure can assure that the bearing member 213, the rolling ball 22 and the connecting member 23 can be in a balanced position and the weighed object can't be fallen down because of loss of balance. In a preferred embodiment, the lower contact surface 213, the upper contact surface 2321 and the rolling ball are in point contact.

The connecting member 23 comprises a fixing end 231 fixed into the fixing hole 421, a limiting end 232 extending into the second receiving space 132 and a connecting part 233 connecting the limiting end 232 to the fixing end 231. The fixing end 231, the limiting end 232 and the connecting part 233 have the same axis, and in the horizontal direction, the limiting end 232 extends outwardly relative to the connecting part 233, so that the limiting end 232 can prevent the connecting member 23 from passing the first receiving space 131 in the vertical direction when in set-up for use. In a preferred embodiment, the end part of the fixing end 231 has thread on its surface. A screw cap 8 connects with the fixing end 231 by screw joint so that the connecting member 23 is fixed to the load cell 4. There is a distance b disposed between the bottom face of the limiting end 232 and the bottom face of the second receiving space 132.

In a preferred embodiment, the distance b is 3 mm. When in use, the supporting member 1 is disposed under the weighed object. When a force such as wind force, internal mixing force, airflow force, shake force or others is applied on the weighed object, the weighed object would fall down, and the weighed object would go upwards and the distance b becomes 0 mm. The bottom face of the limiting end 232 contacts with the bottom face of the second receiving space, so a counterforce is generated and the move is stopped. This kind of structure can prevent the weighed object from falling down when a force is applied on the weighing object and a stable property is obtained.

A 360 degree limiting space is defined between the first receiving space 131 and the connecting part 233. When a force is applied on the weighed object in the horizontal direction, the limiting space permits the weighed object to have a small space and can be stopped after a small movement. This kind of structure can prevent the weighed object from falling down.

Figure 5A:
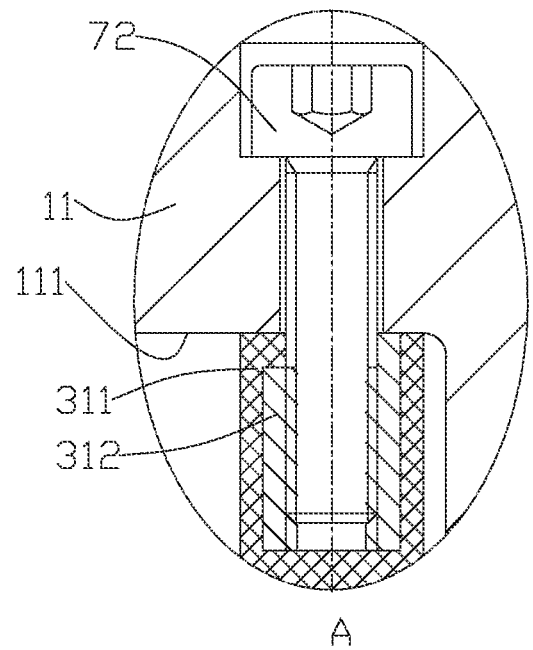
FIG. 5A represents an enlarged view of A in FIG. 4.
Figure 5B:
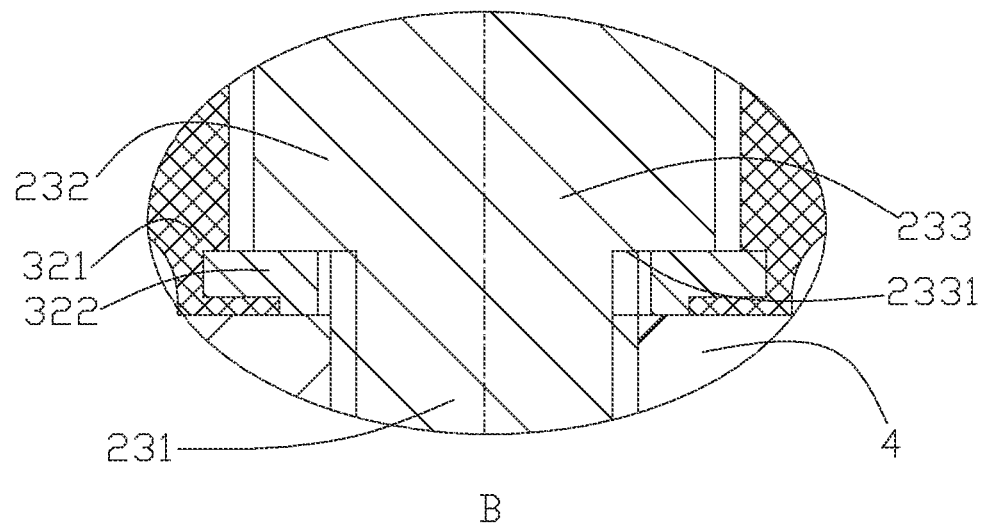
FIG. 5B represents an enlarged view of B in FIG. 4.

Further with reference to FIG. 5A and FIG. 5B, a sealing member 3 is disposed under the supporting member 1. The sealing member 3 can be fixed to the supporting member 1 by a second bolt 72. The sealing member 3 is a food-grade silicone. A first rigid part 312 is embedded in the first end 311 of the sealing member 3 and the first rigid part 312 has thread in it. When mounting the sealing member 3, the second bolt 72 connects with the first rigid part 312 by screw joint and fixes the first end 311 to the bottom face 111 of the supporting member 1. Because the first rigid part 312 is embedded in the first end 311, a good sealing property is obtained between the first end 311 of the sealing member 3 and the supporting member 1.

The connecting member 23 goes through the sealing member 3 and extends into the fixed hole 421. A second rigid part 322 is embedded in the second end 321. The second rigid part 322 is fixed between the lode cell 4 and the step face 2331 of the connecting member 23. The height of the sealing member 3 is higher than that of the second rigid part 322, so that a good sealing is obtained therebetween. In the washing environment, the sealing member 3 prevents the water from getting into the receiving hole 13 and the fixing hole 421 so that the possibility of the microorganism breeding is lowered. A swelled raised portion 323 next to the second end 321 is horizontal arranged in the sealing member 3. When there is horizontal force applied, because of the elastic character of silicon rubber, the swelled raised portion 323 generates a restoring force that pulls back the displaced supporting member 1 to the center position, which is the best for accuracy.

Two limiting portions 3221 are formed on the sealing member 3. The two limiting portions 3221 are inserted into two blind holes 422 of the load cell 4, this stops the rotation of the sealing member 3 when tighten the fixing end 231, and makes sure the sealing member 3 is always aligned with the load cell's axis. In a preferred embodiment, the limiting portions 3221 are formed on the second rigid part 322.

Figure 6:
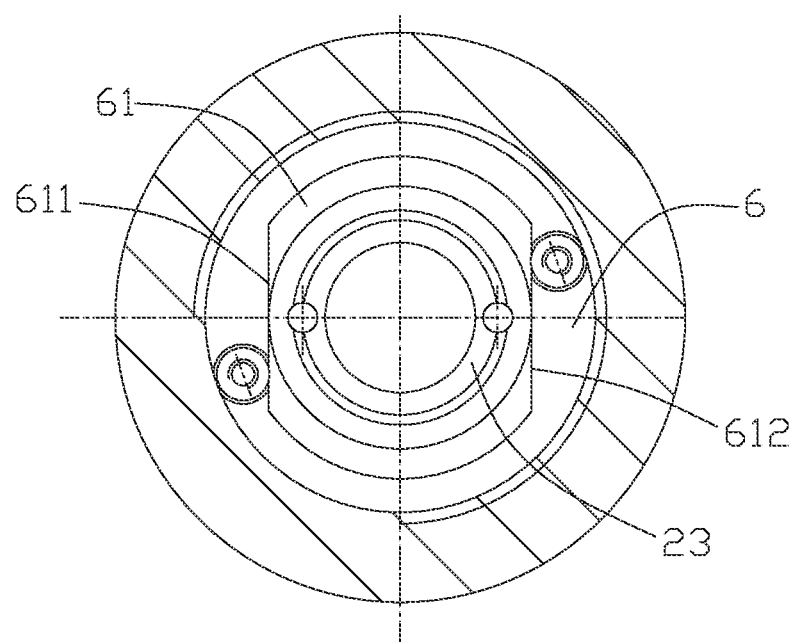
FIG. 6 represents a cross-sectional view taken along line C-C of FIG. 4.

Further with reference to FIG. 6, the weigh module 100 can further comprise a guiding member 6 fixed to the supporting member 1. The guiding member 6 comprises a guiding space 61 extending vertically and two parallel inner faces (611, 612) are defined in the guiding space 61. The connecting member 23 extends into the guiding space 61 and connects with the two inner faces (611, 612). In other embodiment, there is a small distance between the connecting member 23 and the two inner faces (611, 612). The weigh module 100 can sustainably move in a direction parallel to the inner faces (321, 322) in the horizontal direction, and the weigh module 100 can't move in the direction perpendicular to the inner faces (611, 612). In the preferred embodiment, the guiding member 6 is a ring-shaped structure, and the contact between the guiding member 6 and the connecting member 23 is a point contact. The guiding space 61 and the two parallel inner faces (611, 612) can also be defined by the supporting member as a one piece design of the supporting member 1 and the guiding member 6.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A weigh module, comprising:
   a load cell;
   a supporting member comprising a receiving hole extending vertically and through the supporting member;
   a connecting member, the connecting member comprising a fixing end fixed to the load cell and a limiting end extending into the receiving hole, the limiting end being configured to prevent the supporting member to be lift off from the connecting member; and
   a sealing member comprising:
   a first end, having a first rigid part embedded therein, through which the first end is fixed to the supporting member,
   a second end, having a second rigid part embedded therein, fixed to the load cell and
   a raised portion.

2. The weigh module of claim 1, wherein:
   the load cell comprises two blind holes, the sealing member comprising two limiting portions inserted into the two blind holes.

3. The weigh module of claim 1, wherein:
the sealing member is made of rubber material, with the raised portion being formed on the second rigid part.

4. The weigh module of claim 1, wherein:
the raised portion is formed between the supporting member and the load cell.

5. The weigh module of claim 1, wherein:
the second end is fixed to the load cell by the connecting member.

6. The weigh module of claim 1, wherein:
the receiving hole comprises thread therein, the weigh module further comprising a bearing member disposed in the receiving hole and connecting with the supporting member by screw joint and a rolling ball disposed between the bearing member and the connecting member, the rolling ball being one point contact with the bearing member and the connecting member respectively.

7. The weigh module of claim 6, wherein:
a distance is formed between the bottom face of limiting end and the supporting member.

8. The weigh module of claim 1, wherein:
two parallel inner faces are formed in the receiving hole, the connecting member cooperating with the parallel inner faces whereby the supporting member can substantially move in a direction parallel with the inner faces.

9. The weigh module of claim 8, wherein:
the connecting member is in point contact with the parallel inner faces respectively.

10. The weigh module of claim 8, further comprising:
a guiding member, the two parallel inner faces being formed in the guiding member.

\* \* \* \* \*

UNITED STATES PATENT AND TRADEMARK OFFICE
CERTIFICATE OF CORRECTION

PATENT NO. : 10,775,227 B2
APPLICATION NO. : 16/075123
DATED : September 15, 2020
INVENTOR(S) : Zhang et al.

Page 1 of 1

It is certified that error appears in the above-identified patent and that said Letters Patent is hereby corrected as shown below:

On the Title Page

Item (72), Inventors:
Please delete "Ping Zhang, Jiangsu (CN); Haitao Zhang, Jiangsu (CN); Christian Gabis, Columbus, OH (US); Tom Leahy, Tipperary (IE)"
And insert -- Ping Zhang, Changzhou, Jiangsu (CN); Haitao Zhang, Changzhou, Jiangsu (CN); Christian Gabis, Columbus, OH (US); Tom Leahy, Tipperary (IE) --.

Item (30), Foreign Application Priority Data:
Please delete "Feb. 3, 2016 (CN) 2016 1 0078496
 Feb. 3, 2016 (CN) 2016 2 0112692 U"
And insert -- Feb. 3, 2016 (CN) 201610078496.3
 Feb. 3, 2016 (CN) 201620112692.3 --.

Signed and Sealed this
Eighth Day of December, 2020

Andrei Iancu
*Director of the United States Patent and Trademark Office*